United States Patent
Minagawa (12)

(10) Patent No.: US 6,382,286 B1
(45) Date of Patent: May 7, 2002

(54) PNEUMATIC TIRES

(75) Inventor: Yasuhisa Minagawa, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/692,110

(22) Filed: Oct. 20, 2000

(30) Foreign Application Priority Data

Oct. 20, 1999 (JP) ............................. 11-298020
Aug. 8, 2000 (JP) ........................... 2000-239507

(51) Int. Cl.$^7$ ................ B60C 1/00; B60C 13/00; C08F 8/00
(52) U.S. Cl. ................ 152/525; 525/191; 525/212; 525/213; 152/524; 152/555
(58) Field of Search ................ 525/191, 212, 525/213; 152/524, 525, 555

(56) References Cited

U.S. PATENT DOCUMENTS 5,714,022 A * 2/1998 Nagao et al. ............ 152/525

FOREIGN PATENT DOCUMENTS

| EP | 0 801106 A1 | 10/1997 |
|---|---|---|
| JP | 521761 | 1/1977 |
| JP | 5611933 | 2/1981 |
| JP | 1297307 | 11/1989 |
| JP | 8231773 | 9/1996 |
| WO | WO9203302 | 3/1992 |
| WO | WO9401295 | 1/1994 |

\* cited by examiner

Primary Examiner—Samuel A. Acquah
(74) Attorney, Agent, or Firm—Birch Stewart Kolasch & Birch LLP

(57) ABSTRACT

The object of the present invention is to provide a pneumatic tire having a sidewall rubber, which has improved weatherability and flexing fatigue resistance and is not discolored. The pneumatic tire comprises a pair of bead cores, a toroidal carcass fixed by turning down both ends thereof at the bead core, a belt layer arranged in the peripheral direction outside of the crown of the carcass, a tread arranged outside of the belt layer, and a sidewall rubber arranged outside of the carcass, wherein the sidewall rubber has a two-layer structure comprising an inner layer rubber adjacent to the carcass and an outer layer rubber arranged outside thereof, and the outer layer rubber comprises 40 to 90% by weight of at least one diene rubber selected from a group consisting of a natural rubber, an isoprene rubber, a styrene-butadiene rubber and a butadiene rubber, and 10 to 60% by weight of a rubber obtained by halogenating a copolymer of an isomonoolefin having 4 to 7 carbon atoms and p-alkylstyrene, as a rubber component.

5 Claims, 1 Drawing Sheet

PNEUMATIC TIRES

BACKGROUND OF THE INVENTION

The present invention relates to a pneumatic tire having a sidewall rubber, which has improved weatherability and flexing fatigue resistance and is not discolored even if it is used for a long time.

As a sidewall rubber for tires, there has been generally used a rubber (highly unsaturated rubber) with a high content of a double bond, such as a natural rubber, an isoprene rubber and a butadiene rubber. Since these highly unsaturated rubbers have double bonds in the main chain, these are poor in ozone resistance, heat resistance etc., and thus crack may be formed during long-term storage and use. Accordingly, an amine antioxidant and a wax have been mixed therewith for the purpose of preventing crack.

However, there was a problem that the surface of the sidewall rubber was bloomed with the amine antioxidant and the wax during long-term storage or use, and then the surface of the sidewall rubber was discolored.

As a means to solve these problems, use of a rubber excellent in weatherability, such as ethylene propylene diene rubber (EPDM) has been proposed (Japanese Examined Patent Publication No. 52-1761/1977, Japanese Unexamined Patent Publication No. 56-11933/1981, Japanese Unexamined Patent Publication No. 1-297307/1989, Japanese Unexamined Patent Publication No. 8-231773/1996 etc.). However, since EPDM has an ethylene segment, the ethylene segment is crystallized and crack is formed from the crystalline as an origin, when a tire made from EPDM is cooled after it is heated to nearly 100° C. in a use thereof.

Accordingly, the object of the present invention is to provide a pneumatic tire having a sidewall rubber which is excellent in weatherability and flexing fatigue resistance, is not discolored and does not form crack from crystalline.

SUMMARY OF THE INVENTION

The present invention relates to a pneumatic tire comprising a pair of bead cores, a toroidal carcass fixed by turning down both ends thereof at the bead core, a belt layer arranged in the peripheral direction outside of the crown of the carcass, a tread arranged outside of the belt layer, and a sidewall rubber arranged outside of the carcass, wherein the sidewall rubber has a two-layer structure comprising an inner layer rubber adjacent to the carcass and an outer layer rubber arranged outside thereof, and the outer layer rubber comprises 40 to 90% by weight of at least one diene rubber selected from a group consisting of a natural rubber, an isoprene rubber, a styrene-butadiene rubber and a butadiene rubber, and 10 to 60% by weight of a rubber obtained by halogenating a copolymer of an iso-monoolefin having 4 to 7 carbon atoms and p-alkylstyrene, as a rubber component.

In the above-mentioned pneumatic tire, a softener for a rubber is preferably mixed with the outer layer rubber.

In the above-mentioned pneumatic tire, the relationship between the JIS A hardness ($H_{SO}$) of the outer layer rubber and the JIS A hardness ($H_{SI}$) of the inner layer rubber preferably satisfies the following equation (1):

$$H_{SI}-10 \leq H_{SO} \leq H_{SI}-3 \tag{1}$$

In the above-mentioned pneumatic tire, it is preferable that the diene rubber in the outer layer rubber comprises a natural rubber or an isoprene rubber and a butadiene rubber, and an amount of the butadiene rubber based on the natural rubber or the isoprene rubber is more than 1.

In the above-mentioned pneumatic tire, the thickness of the outer layer rubber is preferably 0.6 to 2.0 mm.

In the above-mentioned pneumatic tire, the thickness of the inner layer rubber is preferably 2 to 8 mm.

DETAILED DESCRIPTION

Figure 1:
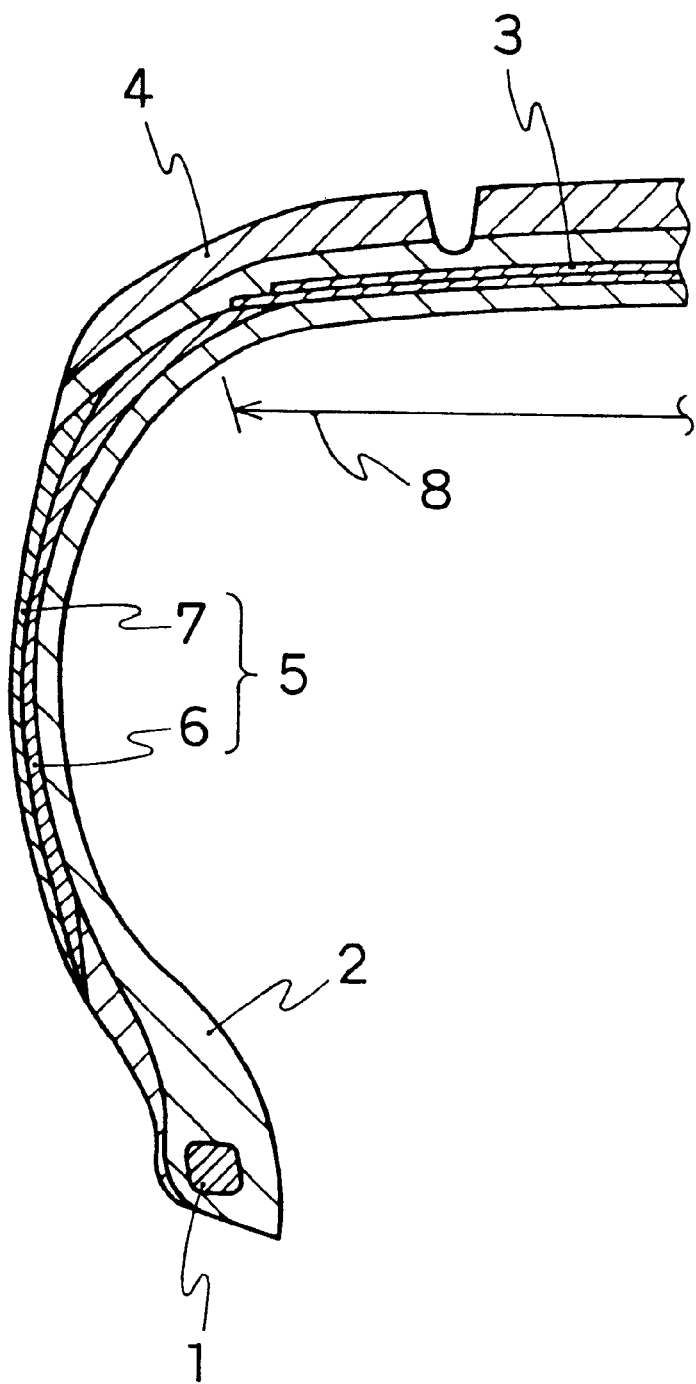
FIG. 1 is a partial sectional view of the pneumatic tire of the present invention.

Hereinafter, the construction of the present invention is explained by using FIG. 1.

The pneumatic tire of the present invention comprises a pair of bead cores 1, a toroidal carcass 2 fixed by turning down both ends thereof at the bead core, a belt layer 3 arranged in the peripheral direction outside of the crown 8 of the carcass, a tread 4 arranged outside of the belt layer, and a sidewall rubber 5 arranged outside of the carcass.

The sidewall rubber 5 in the present invention comprises a two-layer structure comprising an inner layer rubber 6 adjacent to the carcass 2 and an outer layer rubber 7 arranged outside thereof.

The outer layer rubber comprises a diene rubber and a halogenated copolymer rubber obtained by halogenating a copolymer of a iso-monoolefin having 4 to 7 carbon atoms and p-alkylstyrene, as a rubber component.

An amount of the mixed diene rubber is 40 to 90% by weight, preferably 50 to 80% by weight, more preferably 55 to 80% by weight. If the amount of the mixed diene rubber is less than 40% by weight, adhesion to the inner layer rubber 6 becomes significantly low and simultaneously flexing fatigue resistance becomes also low. On the other hand, if the amount is more than 90% by weight, satisfactory weatherability cannot be achieved.

The diene rubber is at least one selected from the group consisting of a natural rubber, an isoprene rubber, a styrene-butadiene rubber and a butadiene rubber. Tensile properties, particularly breaking strength and flexing fatigue resistance are important for the outer layer rubber in the sidewall rubber. These properties can be maintained by incorporating 40 to 90% by weight of at least one of these diene rubbers into the rubber component.

As the styrene-butadiene rubber, there can be used a styrene-butadiene rubber obtained by solution polymerization and a styrene-butadiene rubber obtained by emulsion polymerization, wherein an amount of the styrene unit is preferably 10 to 40% by weight.

From the viewpoint of improvement in properties at a low temperature, the diene rubber is preferably a natural rubber or an isoprene rubber and a butadiene rubber.

When the natural rubber and the butadiene rubber are used as the diene rubber, a weight ratio of the butadiene rubber to the natural rubber is preferably more than 1, more preferably above 1 to 1.8, and most preferably above 1 to 1.5. When the ratio of the mixed butadiene rubber is less than 1, the flexing fatigue resistance is lowered. When the ratio is more than 1.8, the strength is significantly lowered.

When the isoprene rubber and the butadiene rubber are used as the diene rubber, a weight ratio of the butadiene rubber to the isoprene rubber is preferably 1 to 1.8, more preferably 1 to 1.5.

An amount of the halogenated copolymer rubber obtained by halogenizing a copolymer of an iso-monoolefin having 4 to 7 carbon atoms and p-alkylstyrene is 10 to 60% by weight, preferably 20 to 50% by weight, more preferably 20 to 45% by weight. When the amount of the halogenated copolymer rubber is less than 10% by weight, weatherability cannot be satisfactorily achieved. When the amount is more than 60% by weight, adhesion to the inner layer rubber 6 is significantly lowered, and simultaneously the breaking strength and flexing fatigue resistance is also lowered.

Examples of the above-mentioned iso-monolefin having 4 to 7 carbon atoms are iso-butylene, 2-methyl-1-butene, 2-methyl-2-butene, 2,3-dimethyl-2-butene and the like.

The above-mentioned p-alkylstyrene is preferably the one having 1 to 6, more preferably 1 to 5, carbon atoms of an alkyl group.

In the halogenation, a part or all of the hydrogen atoms are replaced by using halogens such as bromine, chlorine and iodine. A content of the halogen in the halogenated copolymer is preferably 0.1 to 5% by weight, more preferably 0.1 to 2% by weight. If the content of halogen is less than 0.1%, the strength thereof tends to be lowered since a vulcanization degree is too low. If the content is more than 5%, the copolymer tends to be rigid since a vulcanization degree is high.

The halogenated copolymer can be prepared, for example, by mixing isobutylene with p-alkylstyrene in a predetermined ratio, polymerizing them to obtain a copolymer by a conventional polymerization method, and partially replacing hydrogen atoms on the alkyl group in p-alkylstyrene unit by halogens such as chlorine. This process is shown as follows:

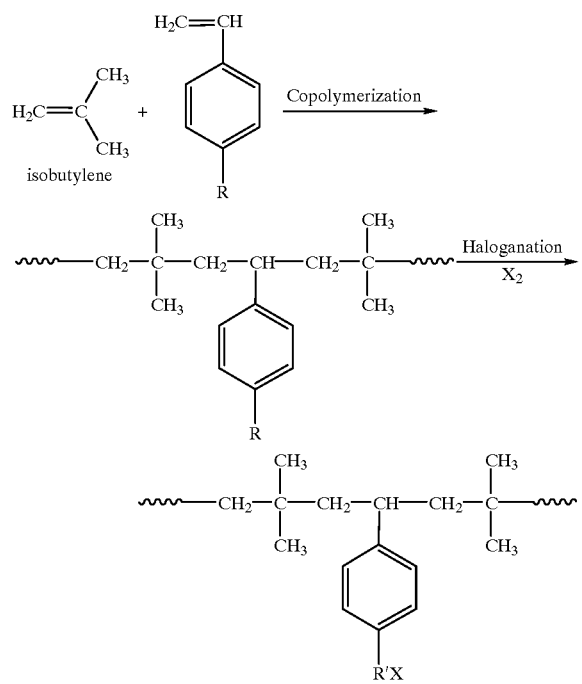

wherein R represents an alkyl group having 1 to 6 carbon atoms, R' represents an alkyl group having 1 to 6 carbon atoms whose hydrogen atoms are partially replaced by a halogen, and X represents a halogen.

A content of a p-alkylstyrene unit in the halogenated copolymer is preferably 3 to 20% by weight. If the content of the p-alkylstyrene unit is less than 3% by weight, adhesion to the inner layer rubber tends to be lowered. If the content is more than 20% by weight, the copolymer tends to be highly rigid and not only tensile properties but also flexing fatigue resistance tend to be low.

A weight average molecular weight of the halogenated copolymer is preferably 300,000 to 700,000, and a glass transition temperature thereof is preferably −60 to −40° C.

It is thought that the halogenated copolymer is usually cross-linked by eliminating a substituted halogen in the alkyl group of the p-alkylstyrene unit due to mixing metal oxides and sulfur, and by reacting the substituted halogen with a phenyl group in the adjacent p-alkylstyrene unit.

The outer layer rubber is preferably mixed with softeners for a rubber such as a softener of petroleum, a softener of paraffin, a softener of aromatics, a softener of naphthene, a softener of aliphatics and a softener of synthetic resin in an amount of 0.5 to 5 parts by weight based on 100 parts by weight of the rubber component. It is difficult to mix the halogenated copolymer with diene rubbers such as a natural rubber and a butadiene rubber, thus dispersion thereof often becomes insufficient. Accordingly, the softener for a rubber can be mixed in an amount of 0.5 to 5 parts by weight, more preferably 0.7 to 3 parts by weight, so that dispersibility can be improved by raising the compatibility therebetween to improve flexing fatigue resistance and ozone resistance. Among the softeners for a rubber, the softener of aliphatics, the softener of aromatics or a mixture of phenol resin are preferable. Particularly, for example, Struktol 40 MS and Struktol 60 MS available from S&S Japan are preferable.

The outer layer rubber can be formed into a sheet, for example, by kneading the rubber component with the softener for a rubber in a Banbury mixer or a kneader and then sheeting with a roll, an extruder and the like.

JIS A hardness of the outer layer rubber after vulcanization is preferably adjusted to 52 to 59, more preferably 54 to 58.

Thickness of the outer layer rubber is 0.6 to 2 mm, preferably 0.7 to 1.8 mm, and more preferably 0.7 to 1.5 mm. If the thickness of the outer layer rubber is less than 0.6 mm, crack occurs. If the thickness is more than 2 mm, costs in preparation become high.

Thickness of the outer layer rubber is preferably at most 60%, more preferably 20 to 50%, of the thickness of the sidewall rubber.

As the inner layer rubber, a raw rubber generally used in rubber compositions for sidewall can be used without any particular limitation. Examples of the rubber are a natural rubber, a butadiene rubber, an isoprene rubber, a styrene-butadiene rubber, a butyl rubber, a halogenated butyl rubber, p-methylstyrene-isobutylene brominated rubber, and a terpolymer rubber of ethylene-propylene-diene (EPDM-EPT) and the like. These may be used solely or in a combination use of two or more thereof.

The inner layer rubber can also be formed into a sheet after kneading the rubber component in the same manner as in the outer layer rubber.

The pneumatic tire of the present invention has a two-layer structure of a sidewall rubber, and the functions of the sidewall rubbers are shared by the inner layer rubber and the outer layer rubber. Namely, the halogenated copolymer is incorporated into the outer layer rubber, and simultaneously the JIS A hardness (HSO) is adjusted to 52 to 59, and the JIS A hardness ($H_{SI}$) of the inner layer rubber satisfies the equation (1):

$$H_{SI}-10 \leq H_{SO} \leq H_{SI}-3 \tag{1}$$

Rigidity of the sidewall rubber can be maintained and flexing fatigue resistance can be improved by enlarging the hardness of the inner layer rubber within the predetermined range higher than the hardness of the outer layer rubber.

Although the thickness of the inner layer rubber is not particularly limited, the thickness is preferably 2 to 8 mm, more preferably 2 to 5 mm. If the thickness of the inner layer rubber is less than 2 mm, function of protecting the carcass tends to be low. If the thickness is more than 8 mm, weight of the tire merely increases.

The inner layer rubber and the outer layer rubber in the present invention can also contain fillers such as carbon black in addition to the above-mentioned rubber component. An amount of carbon black is preferably 30 to 60 parts by weight based on 100 parts by weight of the rubber component contained in the inner layer rubber and the outer layer rubber, respectively. If the amount of carbon black is less than 30 parts by weight, strength tends to be low. If the amount is more than 60 parts by weight, the rubber tends to be rigid.

The inner layer rubber and the outer layer rubber in the present invention can be mixed with various additives used generally in the rubber industry, such as various process oils, waxes, antioxidants, metal oxides, stearic acid, zinc oxide, vulcanizing agents (sulfur and the like) and vulcanization accelerators, in addition to the rubber components and fillers.

The sidewall rubber of the present invention can be obtained, for example, by laying the inner layer rubber on the outer layer rubber and by vulcanizing them.

Hereinafter, the present invention is explained in more detail by using Test Examples and Examples, but the present invention is not limited thereto.

"Part" and "%" show "part by weight" and "% by weight", respectively, otherwise specified. Components used in Test Examples and Examples below are shown as follows:
NR: RSS#3
BR: Nipol 1220 (available from Nippon Zeon Co., Ltd.).
EPDM: ESPRENE 582F (available from Sumitomo Chemical Co., Ltd.).
EXXPRO: EXXPRO 90-10 (available from Exxon Chemical Corporation), copolymer of isobutylene-p-methylstyrene with a bromine content of about 2% and a content of a p-methylstyrene unit of 7.5%
Carbon black: Seast SO (available from Tokai Carbon Co., Ltd.)
Process oil: Diana Process Oil PW32 (available from Idemitsu Kosan Co., Ltd.)
Wax: Sunnoc (Ouchi Shinko Kagaku Kogyo Co., Ltd.).
Antioxidant: Nocrac 6C (N-phenyl-N'-(1,3-dimethyl butyl)-p-phenylene diamine) (Ouchi Shinko Kagaku Kogyo Co., Ltd.).
Softener for rubber: Struktol 40MS (S&S Japan Co., Ltd.).
Zinc oxide: available from Mitsui Mining & Smelting Co., Ltd.
Stearic acid: available from NOF CORPORATION
Sulfur: available from Tsurumi Chemical Co., Ltd.
Vulcanization accelerator: NOCCELER DM (dibenzothiazyl disulfide) (Ouchi Shinko Kagaku Kogyo Co., Ltd.).

TEST EXAMPLES 1 TO 8

Rubber Sheet

According to the composition in Table 1, these chemicals other than sulfur and the vulcanization accelerator were kneaded in an 1.7-L Banbury mixer. Thereto were added sulfur and the vulcanization accelerator to prepare an unvulcanized rubber sheet. And following tests were carried out.

Ozone Resistance

The above unvulcanized rubber sheet was vulcanized at 170° C. for 15 minutes to prepare a vulcanized rubber sheet. The sheet was examined under the conditions of a temperature of 40° C., an ozone concentration of 50 pphm, an elongation degree of 50%, and for 96 hours, according to JIS K6301. Crack state of the test specimen was judged according to JIS K6301.

Flexing Fatigue Resistance (at a Room Temperature)

The above unvulcanized rubber sheet was vulcanized at 170° C. for 15 minutes and was examined in a flexing crack test according to JIS K6301. In the test, after the specimen was bent repeatedly 100,000 times, the specimen was evaluated based on the length (mm) of crack growth.

Flexing Fatigue Resistance (at a High Temperature)

The test specimen was examined in an atmosphere at 80° C. in the same manner as in the flex crack test at a room temperature, to evaluate the length (mm) of crack growth.

Adhesive Property

The above unvulcanized rubber sheet was laid on the unvulcanized sheet in Test Example 1. These sheets were adhered by vulcanization at 170° C. for 15 minutes, and cut into pieces of 2.5 cm in width to prepare a specimen for adhesion peeling test. The specimen was peeled off at a separation rate of 50 mm/minute to evaluate the peeling strength. Unit of the peeling strength is expressed as "kgf/2.5 cm". A higher value shows higher peeling strength, and a sample showing a value of at least 100 kgf/2.5 cm means practically usable one.

Appearance Discoloration

By using rubber plates of 4 mm in thickness vulcanized at 170° C. for 15 minutes, these were placed outdoor in such away that they were not exposed to rain. After the specimens were placed outdoor for 30 days, their appearance was visibly observed to determine the degree of discoloration in 5 ranks. A smaller value shows a higher degree of discoloration.

Results are shown in Table 1.

TABLE 1

|  | Test Ex. | | | | | | | |
| --- | --- | --- | --- | --- | --- | --- | --- | --- |
|  | 1 | 2 | 3 | 4 | 5 | 6 | 7 | 8 |
| Outer rubber (part) | | | | | | | | |
| NR | 45 | 35 | 40 | 35 | 25 | 20 | 35 | 35 |
| BR | 55 | 35 | 40 | 35 | 20 | 15 | 35 | 35 |
| EPDM | — | 30 | — | — | — | — | — | — |
| EXXPRO | — | — | 20 | 30 | 55 | 65 | 30 | 30 |
| Carbon black | 60 | 40 | 40 | 40 | 40 | 40 | 40 | 40 |
| Process oil | 5 | 5 | 5 | 5 | 5 | 5 | 5 | 5 |
| Wax | 1.5 | — | — | — | — | — | — | — |
| Antioxidant | 2.5 | — | — | — | — | — | — | — |

TABLE 1-continued

|  | Test Ex. | | | | | | | |
| --- | --- | --- | --- | --- | --- | --- | --- | --- |
|  | 1 | 2 | 3 | 4 | 5 | 6 | 7 | 8 |
| Softener for rubber | — | — | — | — | — | — | 3 | 7 |
| Zinc oxide | 2 | 2 | 2 | 2 | 2 | 2 | 2 | 2 |
| Stearic acid | 3 | 3 | 3 | 3 | 3 | 3 | 3 | 3 |
| Sulfur | 1 | 1 | 1 | 1 | 1 | 1 | 1 | 1 |
| Vulcanization accelerator | 1.5 | 1.5 | 1.5 | 1.5 | 1.5 | 1.5 | 1.5 | 1.5 |
| Property |  |  |  |  |  |  |  |  |
| JIS A hardness ($H_S$) | 62 | 60 | 55 | 56 | 58 | 60 | 56 | 58 |
| Thickness (at maximum width) (mm) | 1 | 1 | 1 | 1 | 1 | 1 | 1 | 1 |
| Ozone resistance | C5 | No crack | No crack | No crack | No crack | No crack | No crack | No crack |
| Flexing fatigue resistance (room temperature) | 1.2 | 1.1 | 1.0 | 1 | 1.2 | 1.2 | 1.1 | 1.3 |
| Flexing fatigue resistance (high temperature) | 1.4 | 4.3 | 1.1 | 1.1 | 1.2 | 1.2 | 1.1 | 1.5 |
| Adhesive property | 125 | 105 | 125 | 120 | 112 | 43 | 124 | 95 |
| Appearance discoloration | 1 | 4 | 5 | 5 | 5 | 5 | 5 | 4 |

As can be seen from the results in Table 1, the specimens using a predetermined amount of EXXPRO in Test Examples 3, 4 and 5 have not only suppressed discoloration, but also improved ozone resistance and flexing fatigue resistance as compared with the specimen using no EXXPRO in Test Example 1.

The rubber sheet using EPDM in Test Example 2 is excellent in flexing fatigue resistance at a room temperature, but is poor in flexing fatigue resistance at a high temperature. Namely, crack is easily formed under the actually using condition. On the other hand, the test specimens using EXXPRO in Test Examples 3, 4 and 5 are equivalent or slightly superior to the specimen in Test Example 1 with respect to the degree of crack at a high temperature.

However, the specimen using at least 60% by weight of EXXPRO in Test Example 6 did not show sufficient adhesion.

And in the specimens mixed with Struktol 4OMS as a softener for a rubber in Test Examples 7 and 8 in an amount of 0.5 to 5 parts, adhesion strength was improved.

EXAMPLES 1 TO 4 AND COMPARATIVE EXAMPLES 1 TO 2

Tire

Then, the inner layer rubber was combined with the outer layer rubber as shown in Table 2, to constitute sidewall rubbers having a two-layer structure. This sidewall rubber was used to prepare an passenger car steel radial tire (size 195/65R15).

The sidewall rubber was provided with a cut of 0.3 mm in thickness and 5 mm in width and the car was examined for durability by using a drawn tester. The tire is an accepted product if it can run 1000 km without bursting.

Results are shown in Table 2.

TABLE 2

|  | Ex. 1 | Ex. 2 | Ex. 3 | Ex. 4 | Com. Ex. 1 | Com. Ex. 2 |
| --- | --- | --- | --- | --- | --- | --- |
| Inner layer rubber | Test Ex. 1 | Test Ex. 1 | Test Ex. 1 | Test Ex. 4 | Test Ex. 1 | Test Ex. 2 |
| Outer layer rubber | Test Ex. 4 | Test Ex. 5 | Test Ex. 7 | Test Ex. 4 | Test Ex. 2 | Test Ex. 2 |
| $H_{SI}$-$H_{SO}$ | 6 | 4 | 6 | 0 | 2 | 0 |
| Durability test | good | good | good | Burst at 600 km | Burst at 60 km | Burst at 200 km |

As can be seen from Table 2, the specimens in Examples 1 to 3, wherein EXXPRO is used in the outer layer rubber and the relationship between the hardness ($H_{IS}$) of the inner layer rubber and the hardness ($H_{SO}$) of the outer layer rubber is in the predetermined range, are particularly excellent in durability.

TEST EXAMPLES 9 TO 17

Rubber Sheet

The chemicals were used according to the compositions in Table 3 to prepare a unvulcanized rubber sheet in the same manner as in Test Examples 1 to 8. The sheet was examined in the following tests.

Ozone Resistance

The above unvulcanized rubber sheet was vulcanized at 170° C. for 15 minutes to prepare a vulcanized rubber sheet. The sheet was examined under the condition of a temperature of 40° C., an ozone concentration of 50 pphm, an elongation degree of 50%, and for 96 hours according to JIS K6259. Crack state of the test specimen was judged according to JIS K6259.

Flexing Fatigue Resistance

The above unvulcanized rubber sheet was vulcanized at 170° C. for 15 minutes and was examined in a flexing crack test according to JIS K6260. In the test, after the specimen was bent repeatedly 500,000 times, crack state thereof was evaluated by using six classes. The smaller class number shows higher flexing fatigue resistance.

Adhesive Property

Peeling strength was evaluated in the same manner as in Test Examples 1 to 8. Unit of the peeling strength was expressed as "kgf/2.5 cm". A higher value shows higher peeling strength, and a sample showing a value of at least 100 kgf/2.5 cm indicates that the sample is practically usable.

Appearance Discoloration

The test specimen was examined outdoor in the same manner as in Test Examples 1 to 8 to evaluate the degree of discoloration in 5 ranks. A smaller value shows a higher degree of discoloration.

TABLE 3

| | Test Example | | | | | | | | |
|---|---|---|---|---|---|---|---|---|---|
| | 9 | 10 | 11 | 12 | 13 | 14 | 15 | 16 | 17 |
| Composition (part) | | | | | | | | | |
| NR | 35 | 30 | 25 | 40 | 35 | 30 | 25 | 45 | 17.5 |
| BR | 35 | 30 | 25 | 30 | 25 | 40 | 35 | 55 | 17.5 |
| EXXPRO | 30 | 40 | 50 | 30 | 40 | 30 | 40 | — | 65 |
| Carbon black | 40 | 40 | 40 | 40 | 40 | 40 | 40 | 60 | 40 |
| Process oil | 5 | 5 | 5 | 5 | 5 | 5 | 5 | 5 | 5 |
| Wax | — | — | — | — | — | — | — | 1.5 | — |
| Antioxidant | — | — | — | — | — | — | — | 2.5 | — |
| Zinc oxide | 2 | 2 | 2 | 2 | 2 | 2 | 2 | 2 | 2 |
| Stearic acid | 3 | 3 | 3 | 3 | 3 | 3 | 3 | 3 | 3 |
| Sulfur | 1 | 1 | 1 | 1 | 1 | 1 | 1 | 1 | 1 |
| Vulcanization accelerator | 1.5 | 1.5 | 1.5 | 1.5 | 1.5 | 1.5 | 1.5 | 1.5 | 1.5 |
| Property | | | | | | | | | |
| JIS A hardness ($H_S$) | 56 | 57 | 58 | 56 | 57 | 56 | 57 | 62 | 60 |
| Ozone resistance | No crack | No crack | No crack | No crack | No crack | No crack | No crack | CS | No crack |
| Flexing fatigue resistance | First class | First class | First class | First class | First class | First class | First class | Second class | Second class |
| Adhesive property | 120 | 112 | 106 | 120 | 112 | 116 | 109 | 125 | 57 |
| Appearance discoloration | 5 | 5 | 5 | 5 | 5 | 5 | 5 | 1 | 5 |

As can be seen from the results in Table 3, the specimens using a predetermined amount of EXXPRO in Test Examples 9 to 15, have not only suppressed discoloration, but also improved ozone resistance and flexing fatigue resistance as compared with the specimen using no EXX-PRO in Test Example 16. Further, the specimen using at least 60% by weight of EXXPRO in Test Example 17 shows insufficient adhesive property.

TEST EXAMPLES 18 TO 33

Inner Layer Rubber-Outer Layer Rubber

According to Table 4, the unvulcanized rubber sheet in Test Examples 9 to 15 was laid on the unvulcanized rubber sheet in Test Example 16. These sheets were vulcanized at 170° C. for 15 minutes to prepare a sample having a two-layer structure. By using these samples, flex crack test was carried out in the same manner as in Test Examples 9 to 17. If an amount of BR in the outer layer rubber is smaller than that of NR, the degree of crack formation increases in case that the thickness of the outer layer rubber is less than 0.6 mm. On the other hand, if the amount of BR is higher than that of NR, the degree of crack formation is low even if the thickness of the outer layer rubber is 0.4 mm.

TABLE 4

| Test Ex. No. | Outer layer rubber | | Inner layer rubber | | Resistance to flexing fatigue |
|---|---|---|---|---|---|
| | Composition | Thickness (mm) | Composition | Thickness (mm) | |
| 18 | Test Ex. 9 | 1.8 | Test Ex. 16 | 3.2 | First class |
| 19 | Test Ex. 9 | 1.2 | Test Ex. 16 | 3.8 | First class |
| 20 | Test Ex. 9 | 0.7 | Test Ex. 16 | 4.3 | First class |
| 21 | Test Ex. 9 | 0.5 | Test Ex. 16 | 4.5 | Fourth class |
| 22 | Test Ex. 11 | 1.8 | Test Ex. 16 | 3.2 | First class |
| 23 | Test Ex. 11 | 1.2 | Test Ex. 16 | 3.8 | First class |
| 24 | Test Ex. 11 | 0.7 | Test Ex. 16 | 4.3 | First class |

TABLE 4-continued

| Test Ex. No. | Outer layer rubber | | Inner layer rubber | | Resistance to flexing fatigue |
|---|---|---|---|---|---|
| | Composition | Thickness (mm) | Composition | Thickness (mm) | |
| 25 | Test Ex. 11 | 0.5 | Test Ex. 16 | 4.5 | Fourth class |
| 26 | Test Ex. 12 | 0.7 | Test Ex. 16 | 4.3 | First class |
| 27 | Test Ex. 12 | 0.5 | Test Ex. 16 | 4.5 | Fourth class |
| 28 | Test Ex. 13 | 0.7 | Test Ex. 16 | 4.3 | First class |
| 29 | Test Ex. 13 | 0.5 | Test Ex. 16 | 4.5 | Fourth class |
| 30 | Test Ex. 14 | 0.7 | Test Ex. 16 | 4.3 | First class |
| 31 | Test Ex. 14 | 0.4 | Test Ex. 16 | 4.6 | First class |
| 32 | Test Ex. 15 | 0.7 | Test Ex. 16 | 4.3 | First class |
| 33 | Test Ex. 15 | 0.4 | Test Ex. 16 | 4.6 | First class |

EXAMPLES 5 to 20

Tire

Then, according to Table 5, tires of 215/45ZR17 size were prepared using a sidewall rubber having a two-layer structure wherein the rubber sheet in Test Examples 9 to 15 was used as the outer layer rubber and the rubber sheet in Test Example 16 was used as the inner layer rubber, to examine durability thereof in drawn tester. The tire is an accepted product if it can run 30,000 km without visible crack forming. As shown in Table 5, if an amount of NR is higher than that of BR, the crack formation could be confirmed on the tire having run up to 30,000 km in case that the thickness of the outer layer was less than 0.6 mm. On the other hand, if the amount of BR was higher than that of NR, the tire was accepted even if the thickness was 0.4 mm.

TABLE 5

| Ex. No. | Outer layer rubber Composition | Thickness (mm) | Inner layer rubber | Durability test |
|---|---|---|---|---|
| 5 | Test Ex. 9 | 1.8 | Test Ex. 16 | good |
| 6 | Test Ex. 9 | 1.2 | Test Ex. 16 | good |
| 7 | Test Ex. 9 | 0.7 | Test Ex. 16 | good |
| 8 | Test Ex. 9 | 0.5 | Test Ex. 16 | Crack formation at 16,000 Km |
| 9 | Test Ex. 11 | 1.8 | Test Ex. 16 | good |
| 10 | Test Ex. 11 | 1.2 | Test Ex. 16 | good |
| 11 | Test Ex. 11 | 0.7 | Test Ex. 16 | good |
| 12 | Test Ex. 11 | 0.5 | Test Ex. 16 | Crack formation at 23,000 Km |
| 13 | Test Ex. 12 | 0.7 | Test Ex. 16 | good |
| 14 | Test Ex. 12 | 0.5 | Test Ex. 16 | Crack formation at 16,000 Km |
| 15 | Test Ex. 13 | 0.7 | Test Ex. 16 | good |
| 16 | Test Ex. 13 | 0.5 | Test Ex. 16 | Crack formation at 23,000 Km |
| 17 | Test Ex. 14 | 0.7 | Test Ex. 16 | good |
| 18 | Test Ex. 14 | 0.7 | Test Ex. 16 | good |
| 19 | Test Ex. 15 | 0.4 | Test Ex. 16 | good |
| 20 | Test Ex. 15 | 0.4 | Test Ex. 16 | good |

According to the present invention, there can be provided a pneumatic tire having a sidewall rubber, which has improved weatherability and flexing fatigue resistance and, is not discolored even if it is used for a long time.

What is claimed is:

1. A pneumatic tire comprising a pair of bead cores, a toroidal carcass fixed by turning down both ends thereof at the bead core, a belt layer arranged in the peripheral direction outside of the crown of the carcass, a tread arranged outside of the belt layer, and a sidewall rubber arranged outside of the carcass, wherein the sidewall rubber has a two-layer structure comprising an inner layer rubber adjacent to the carcass and an outer layer rubber arranged outside thereof, and the outer layer rubber comprises 40 to 90% by weight of at least one diene rubber selected from a group consisting of a natural rubber, an isoprene rubber, a styrene-butadiene rubber and a butadiene rubber, and 10 to 60% by weight of a rubber obtained by halogenating a copolymer of an iso-monoolefin having 4 to 7 carbon atoms and p-alkylstyrene, as a rubber component, wherein a relationship between the JIS A hardness (Hso) of the outer layer rubber and the JIS A hardness ($H_{SI}$) of the inner layer rubber satisfies the following equation (1):

$$H_{SI}-10 \leq Hso \leq H_{SI}-3 \quad (1).$$

2. The pneumatic tire of claim 1, wherein the outer layer rubber is mixed with a softener for a rubber.

3. The pneumatic tire of claim 1, wherein the diene rubber in the outer layer rubber comprises a natural rubber or an isoprene rubber and a butadiene rubber, and an amount of the butadiene rubber based on the natural rubber or the isoprene rubber is more than 1.

4. The pneumatic tire of claim 1, wherein the thickness of the outer layer rubber is 0.6 to 2.0 mm.

5. The pneumatic tire of claim 1, wherein the thickness of the inner layer rubber is 2 to 8 mm.

* * * * *